United States Patent
Mishra et al.

(10) Patent No.: US 10,979,359 B1
(45) Date of Patent: Apr. 13, 2021

(54) POLLING RESOURCE MANAGEMENT SYSTEM

(71) Applicant: Amazon Technologies, Inc., Seattle, WA (US)

(72) Inventors: Gyanendra Mishra, Seattle, WA (US); Surya Prakash Dhoolam, Mill Creek, WA (US); Cecilia Deng, Seattle, WA (US); Hans-Philipp Anton Hussels, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 16/145,886

(22) Filed: Sep. 28, 2018

(51) Int. Cl.
| | |
|---|---|
| *H04L 12/865* | (2013.01) |
| *H04L 12/26* | (2006.01) |
| *H04L 12/24* | (2006.01) |
| *H04L 12/927* | (2013.01) |
| *G06F 16/903* | (2019.01) |

(52) U.S. Cl.
CPC ........ *H04L 47/6275* (2013.01); *G06F 16/903* (2019.01); *H04L 41/5009* (2013.01); *H04L 41/5025* (2013.01); *H04L 43/103* (2013.01); *H04L 47/805* (2013.01)

(58) Field of Classification Search
CPC ............... H04L 47/6275; H04L 47/805; H04L 41/5009; H04L 43/103; G06F 16/903
USPC .................................................. 709/217, 224
See application file for complete search history.

(56) References Cited

U.S. PATENT DOCUMENTS

| | | | | |
|---|---|---|---|---|
| 9,191,299 | B1 * | 11/2015 | Petit | G06Q 50/22 |
| 10,523,532 | B1 * | 12/2019 | Summers | H04L 43/0876 |
| 2016/0352649 | A1 * | 12/2016 | Lin | H04L 47/827 |
| 2017/0316078 | A1 * | 11/2017 | Funke | H04L 67/1097 |
| 2019/0102478 | A1 * | 4/2019 | Wei | G06F 16/903 |

OTHER PUBLICATIONS

Sriraman, Akshitha, and Thomas F. Wenisch. "µTune: Auto-Tuned Threading for {OLDI} Microservices." in 13th {USENIX} Symposium on Operating Systems Design and Implementation ({OSDI} 18), pp. 177-194. 2018. (Year: 2018).*

* cited by examiner

*Primary Examiner* — Suraj M Joshi
*Assistant Examiner* — Melaku Y Habtemariam
(74) *Attorney, Agent, or Firm* — Knobbe, Martens, Olson & Bear, LLP

(57) ABSTRACT

A polling resource management system and methodology for facilitating the management of polling resources for polling message queues. A user interacts with customer applications within a web services system. A polling manager within the web services system utilizes polling resources, such as polling threads, polling assignments, and polling workers to access and implement messages in the message queues. A polling resource manager automatically scales the polling assignments, polling threads, and invoke threads to better utilize the polling resources and to reduce latency experienced by the user when interacting with the customer applications.

27 Claims, 9 Drawing Sheets

POLLING RESOURCE MANAGEMENT SYSTEM

BACKGROUND

Generally described, entities, such as individuals and companies, can provide computer applications that are accessed by user computing devices over communication networks to exchange data or information. Such applications can be hosted in a networked-environment and accessed via the communication network, such as a web service that is provided by a network service provider. Web service technologies typically allow the application provider or content provider, as customers of the web service, access to virtual cluster of computing device, physical or virtual, that are available through a communication network, such as the Internet.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
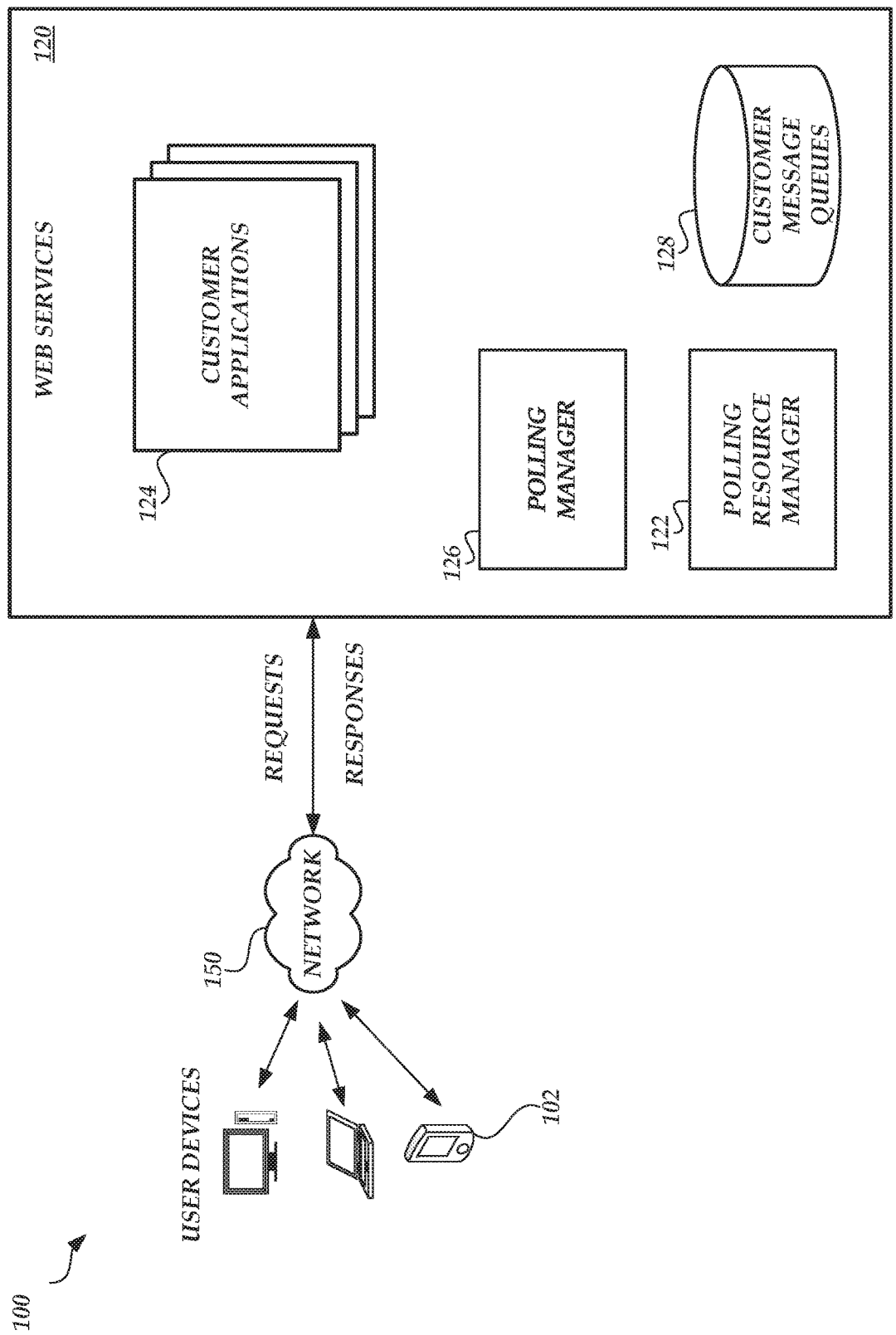
FIG. 1 is a block diagram depicting an illustrative communication environment in which a web services system enables users to interact with customer applications and manages customer message queues according to one embodiment.

Generally described, one or more aspects of the present application relate to the management of communications generated by applications hosted on a web service. More specifically, aspects of the present application correspond to a system management component of a network service provider, where the system management component manages customer message queues associated with customer applications. In particular, the system management component manages polling resources that service or poll the customer message queues.

Generally described, customer applications can be hosted on computing devices provided by the network service provider. Users can access the customer applications and generate user requests for the customer applications. The customer applications, in response to the user requests, can generate messages. The messages can be associated with a function that, when invoked, performs an action responsive to the user request. The customer applications transmit messages into message queues by calling an application programming interface (API), such as a send-message API. The message queues can be stored in the web service provider's platform.

The web service can further provide a polling function or poller to poll or check the message queues for messages. The poller can call an API, such as a receive-message API, to retrieve the customer message on the customer's behalf. In addition, the poller can invoke the function, or cause the invocation of the function, associated with the message by the customer application and delete the message from the message queue after the function has been successfully invoked.

The poller can include polling resources, such as polling assignments, polling threads, and invoke threads. The interaction of the polling resources can be characterized as control plane functionality that relates to management about where the data associated with the messages is sent. Additionally, the interaction of the polling resources can also be characterized as data plane functionality that relates to forwarding the data along the data path according to the decisions made by the control plane. The control plane can be implemented illustratively by computer instructions executing on one or more computing devices as a polling resource manager, further described herein. The data plane can be implemented illustratively by computer instructions executing on one or more computing devices as a polling manager, further described herein. When a customer application creates an event source mapping between a message queue and a function, the control plane creates multiple polling assignments and makes them available to the data plane, which comprises the pollers. For example, the control plane can control the routing of the data and the data plane can carry the message traffic. Polling assignments can be allocated or assigned to a specific customer's message queue. Polling assignments are made up of a set of polling threads representative of a basic unit of processing time. Generally described, a thread is a basic unit to which an operating system of a computer allocates processing time. A polling thread is the basic unit of processing time for polling the message queues. Within the polling assignment, polling threads can concurrently poll the message queue looking for messages. An invoke thread is the basic unit of processing time for invoking the function associated by the customer application with the message. The invoke threads can concurrently invoke the functions from a plurality of messages. Because invoke threads can perform concurrent executions, invoke threads can be shared among more than one polling assignment.

As the number of customer applications hosted by the web service increases and the number of users interacting with each customer application increases, the number of messages waiting in the message queues can increase greatly. The general approach is to statically allocate the polling resources independent of the message traffic. Static allocation of polling resources may not be able to handle the increased number of messages, which can result in under-servicing message queues containing a large number of messages or over-servicing message queues with little message traffic. This, in turn, can increase latency for those customer message queues with high message traffic.

To address at least a portion of the inefficiencies described above with respect to management of polling resources, aspects of the present application correspond to a polling resource manager for the management of polling resources used to service message queues. Aspects of the present application correspond automatically scaling the quantities of polling resources based on the message traffic to the message queues. More specifically, aspects of the present application correspond to the utilization of message traffic to automatically scale or autoscale the quantities of one or more of polling assignments, polling threads, and invoke threads.

As described above, in response to user requests, the customer applications put messages into message queues by calling a send-message API. A polling component or poller synchronously polls or checks the message queues for messages. The poller calls a receive-message API to check the message queue. When the message queue has a message, the poller invokes the function that is indicted by the received message, and deletes the received message from the message queue after a successful invocation.

Illustratively, the implementation of the function of the poller can be organized according to two main execution thread groups, polling threads and invoke threads. Polling threads are executed to receive messages from the message queue. Invoke threads are executed to invoke (or cause the invocation) of the function identified in the retrieved message. When a customer creates an event source mapping between a message queue and an application function, the web services system utilizes the control plane functionality to create one or more polling assignments. The polling assignments are available to the pollers, which are on the data plane. The pollers use the polling assignments to poll the message queues on the data plane. The polling assignments of a single event source mapping can be distributed across multiple pollers and a single poller can be associated with multiple event source mappings.

Pollers are configured to select the available polling assignments, assign polling threads per polling assignment, and use the polling threads to receive the messages from the message queue. When the polling threads receive messages from the message queues, the poller submits the obtained messages to an invoke thread pool for execution. The invoke threads process the messages by invoking the function associated with the message. Invoke threads are shared across all polling assignments on a poller.

Unsuccessful receive-message calls occur when polling the message queue results in an empty message that has no message or function to process. Successful receive-message calls occur when polling the message queue retrieves a non-zero message associated with a function to invoke.

Aspects of the present application are directed to autoscaling the quantities of polling resources associated with message queues based on recent customer traffic patterns. Autoscaling, as used in this application, generally refers to the automatic scaling of polling resources, such as polling assignments, polling threads, and invoke threads by a polling resource manager based on indications of message traffic associated with message queues. Illustratively, the autoscaling functionality may be implemented in consideration of one or more environmental or system constraints. For example, autoscaling functionality may be implemented with consideration of a specified or defined concurrent execution limit. Concurrent executions refers to the number of executions of function code at any given time. In another example, autoscaling functionality may be implemented with consideration of a maximum and minimum number of polling assignments that can be associated with the message queues, the maximum and minimum number of polling threads that can be assigned to a polling assignment, and the maximum and minimum number of invoke threads that can be associated with the polling assignments. Further, the autoscaling functionality may be implemented with consideration of the total number of polling resources available within the web service. In general terms, throughput is the amount of items passing through a system or process. Illustratively, message queue throughput can be characterized as the number of messages serviced by the pollers. The autoscaling functionality can be characterized as providing optimal throughput of messages from the message queues taking into consideration the environmental and system constraints.

Other considerations for autoscaling polling resources include the ramp up rate when increasing the number of polling resources and the ramp-down rate when decreasing the number of polling resources. For example, the frequency of executing the autoscaling routines can be increased to ramp-up the number of polling resources or decreased to ramp-down the number of polling resources. In another example, the number of polling resources added to increase the number of polling resources or subtracted to decrease the number of polling resources can be dynamically allocated. The ramp-up rate can be different from the ramp-down rate.

Polling managers can dynamically adjust the quantity of polling threads associated with a polling assignment, the quantity of polling assignments for the event source mapping, and the quantity of invoke threads available to invoke the function associated with the message based at least in part on the message traffic. Accordingly, dynamically scaling the upward adjustment of polling threads, upward adjustment of polling assignments or upward adjustment of invoke threads can be generally referred to as "autoscale up." Similarly, dynamically scaling the downward adjustment of polling threads, downward adjustment of polling assignments or downward adjustment of invoke threads can be generally referred to as "autoscale down." For example, a polling assignments can illustratively be adjusted within a range of 1-10 and polling threads can be illustratively be adjusted within a range of 1-35

Other aspects of the present application are directed to a polling manager and a polling resource manager of a network service provider that can dynamically scale or autoscale polling resources both within one host and across multiple hosts. Polling threads are polling resources that can be hosted in a single host. Polling threads hosted in a single host are characterized as local to that host and are considered local polling resources. Polling assignment are polling resources that can be hosted across multiple hosts. Polling assignments hosted across multiple hosts are characterized as global to the multiple hosts and are considered global polling resources.

Generally described, once a poller has selected a polling assignment at a host message queue, local autoscaling corresponds to data plane autoscaling of the polling threads and invoke threads based on recent message traffic. The local autoscaling can increase number of polling threads of a polling assignment at a local host message queue to service messages faster for high message traffic and can decrease the number of polling threads of the polling assignment for low message traffic.

In an aspect of the present application, the polling manager having data plane functionality can perform local autoscaling of the polling threads and the invoke threads responsive to the number of recent messages with invoke functions. The polling manager can also unallocate polling assignments based on a determination of low message traffic and queue depth.

Similarly, global autoscaling corresponds to control plane autoscaling of the polling assignments. The global autoscaling can increase the number of polling assignments at a host message queue to process more messages for high message traffic and decrease the number of polling assignments at a host message queue for low message traffic.

In an aspect of the present disclosure, the polling resource manager having control plane functionality can perform global autoscaling of the polling assignments responsive to an aggregation of the local autoscaling decisions and the utilization of the polling assignments.

In another aspect of the present disclosure, the combination of local and global autoscaling can be implemented to autoscale the polling threads, invoke threads, and polling assignments to make the processing of messages at message queues having high message traffic more efficient. In an embodiment, the polling resource autoscaling of the present application combines the local autoscaling of the polling threads and invoke threads with the global autoscaling of the polling assignments. Local autoscaling of the polling threads absorbs spikes in the message traffic while the global autoscaling aggregates the local autoscaling decisions used to determine the autoscaling of the polling assignments.

In an embodiment, the polling manager determines whether the number of polling threads assigned to a polling assignment should be automatically increased, decreased, or not changed based on a success rate. The success rate can be the number of successful invocations to the number of messages received in a time period and can be an indication of message traffic. The success rate can be associated with an upper boundary and a lower boundary. When the success rate is high, such as equal to or greater than the upper boundary, the polling manager automatically increases the number of polling threads associated with the polling assignment to handle the high message traffic. When the success rate is low, such as equal to or less than the lower boundary, the polling manager automatically decreases the number of polling threads assigned to the polling assignment because they are not needed due to low message traffic. The polling manager can determine that no action is needed when the success rate is between the upper and lower boundaries.

In an embodiment, the polling resource manager determines whether the number of polling assignments polling the message queue should be automatically increased, decreased, or not changed based on the decisions of the polling manager and an assignment utilization. The assignment utilization can be number of polling assignments associated with a maximum number polling threads to the total number of polling assignments and can be an indication of message traffic. The assignment utilization can be associated with an upper boundary and a lower boundary. When the assignment utilization is high, such as equal to or greater than the upper boundary, the polling resource manager automatically increases the number polling assignments to handle the high message traffic. When the assignment utilization is low, such as equal to or less than the lower boundary, the polling resource manager automatically decreases the number of polling assignments because they are not needed due to low message traffic. The polling resource manager can determine that no action is needed when the assignment utilization is between the upper and lower boundaries.

In an embodiment, the polling manager automatically determines whether the polling resources are efficiently utilized based on message traffic. For example, the polling manager determines the number of messages polled by a polling assignment and the queue depth, which is the number of messages in the message queue. The number of messages polled and the queue depth can be an indication of message traffic. Based on the number of messages polled and the queue depth, the polling resource manager can unallocate a polling assignment to free up polling resources.

In an embodiment, the polling manager determines whether the number of invoke threads available to a polling assignment should be automatically increased, decreased, or not changed based on an invocation rate. The invocation rate can be the number of successful invocations to the number of messages received in a time period and can be an indication of message traffic. The invocation rate can be associated with an upper boundary and a lower boundary. When the invocation rate is high, such as equal to or greater than the upper boundary, the polling manager automatically increases the number of invoke threads available to the polling assignment to handle the high message traffic. When the invocation rate is low, such as equal to or less than the lower boundary, the polling manager automatically decreases the number of invoke threads available to the polling assignment because they are not needed due to low message traffic. The polling manager can determine that no action is needed when the invocation rate is between the upper and lower boundaries.

Some aspects are directed to a system to manage polling resources comprising one or more computing devices associated with polling managers of a web service. The polling manager can be configured to determine a number queries made to a message queue for messages within a first time period, determine a number of non-zero messages returned from the queries within the first time period, determine a utilization of polling resources based on a number of queries and a number of non-zero messages returned from the queries, and adjust a quantity of the polling resources based on the utilization.

Some aspects are directed to a computer-implemented method to manage polling resources comprising determining a number queries made to a message queue for messages within a first time period, determining a number of non-zero messages returned from the queries within the first time period, determining a utilization of polling resources based on the number of queries and the number of non-zero messages returned from the queries, and adjusting a quantity of the polling resources based on the utilization.

Some aspects are directed to a computer-implemented method to automatically scale polling resources comprising determining a utilization of polling resources based on message traffic associated with a message queue, increasing a quantity of polling resources in response to high message traffic indicated by the utilization, and decreasing the quantity of polling resources in response to low message traffic indicated by the utilization.

FIG. 1 illustrates a web services environment 100 for facilitating user interactions with customers. The web services environment 100 includes one or more user devices 102 in communication via network 150 with customer applications 124 located in a web services system 120. The one or more user devices 102, generally referred to as client computing devices, are utilized by individual users to send requests to and receive responses from the customer applications 124 that are located within the web services system 120. For example, the user can be calling up a web page associated with the customer application and the response can direct the user device 102 to the web page. Illustratively, the customer applications 124 store messages in a database of customer message queues 128 in response to requests received from the user devices 102. The web services system 120 checks the message queues 128 for messages, invokes the function associated with the message, and deletes the messages from the message queues 128. The web services system 120 further manages the polling resources that are used to check the message queue 128, invoke the functions, and delete the message from the message queue 128.

In accordance with embodiments, the web services system 120 includes one or more computing devices, services or components for receiving the user requests, managing the customer message queues 128, managing the polling resources, and sending the response to the user request. As described in further detail below, the web services system 120 can include a polling manager 126 to poll the message queues to receive messages, service the messages, and delete the messages from the customer message queues 128. The polling manager 126 utilizes polling resources to perform the polling functions. The polling resources can include polling assignments, polling threads, and invoke threads or workers. The web services system 120 can further include a polling resource manager 122 to manage the polling resources to reduce latency and to improve utilization of the resources for each customer application 124 and across the plurality of customer applications 124. The polling manager 126 and the polling resource manager 122 may work in conjunction or in a complimentary basis.

It will be appreciated by those of skill in the art that the polling manager 126 and the polling resource manager 122 can be implemented in a distributed manner. Further, the polling manager 126 and the polling resource manager 122 may have fewer or greater components than are illustrated in FIG. 1. Thus, the depiction of the polling manager 126 and the polling resource manager 122 should be taken as illustrative. For example, in some embodiments, components of the polling manager 126 and the polling resource manager 122 may be executed by one more virtual machines implemented in a hosted computing environment. A hosted computing environment may include one or more rapidly provisioned and released computing resources, which computing resources may include computing, networking or storage devices.

It will also be appreciated by those skilled in the art that the web services system 120 may have fewer or greater components than are illustrated in FIG. 1. Thus, the depiction of the web services system 120 in FIG. 1 should be taken as illustrative. For example, in some embodiments, components of the web services system 120 may be executed by one more virtual machines implemented in a hosted computing environment.

With continued reference to FIG. 1, user devices 102 may include any number of different computing devices capable of communicating with the network 150 via a direct connection or via an intermediary. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance (e.g., a thermostat or refrigerator), controller, watch, eyewear, a home or car device, Internet of Things ("IoT") device, virtual reality or augmented reality device, digital media player, and the like. Each user device 102 may optionally include one or more data stores (not shown in FIG. 1) including various applications or computer-executable instructions, such as web browsers, used to implement the embodiments disclosed herein. Illustrative components of a user device 102 will be described with regard to FIG. 2.

Network 150 may be any wired network, wireless network, or combination thereof. In addition, the network 150 may be a personal area network, local area network, wide area network, cable network, fiber network, satellite network, cellular telephone network, data network, or combination thereof. In the example environment of FIG. 1, network 150 is a global area network (GAN), such as the Internet. Protocols and components for communicating via the other aforementioned types of communication networks are well known to those skilled in the art of computer communications and thus, need not be described in more detail herein. While each of the user devices 102 and web services system 120 are depicted as having a single connection to the network 150, individual components of the user devices 102 and web services system 120 may be connected to the network 150 at disparate points. Accordingly, communication times and capabilities may vary between the components of FIG. 1. Likewise, although FIG. 1 is illustrated as a single network 150, one skilled in the relevant art will appreciate that the web services system 120 may utilize any number or combination of networks.

Figure 2:
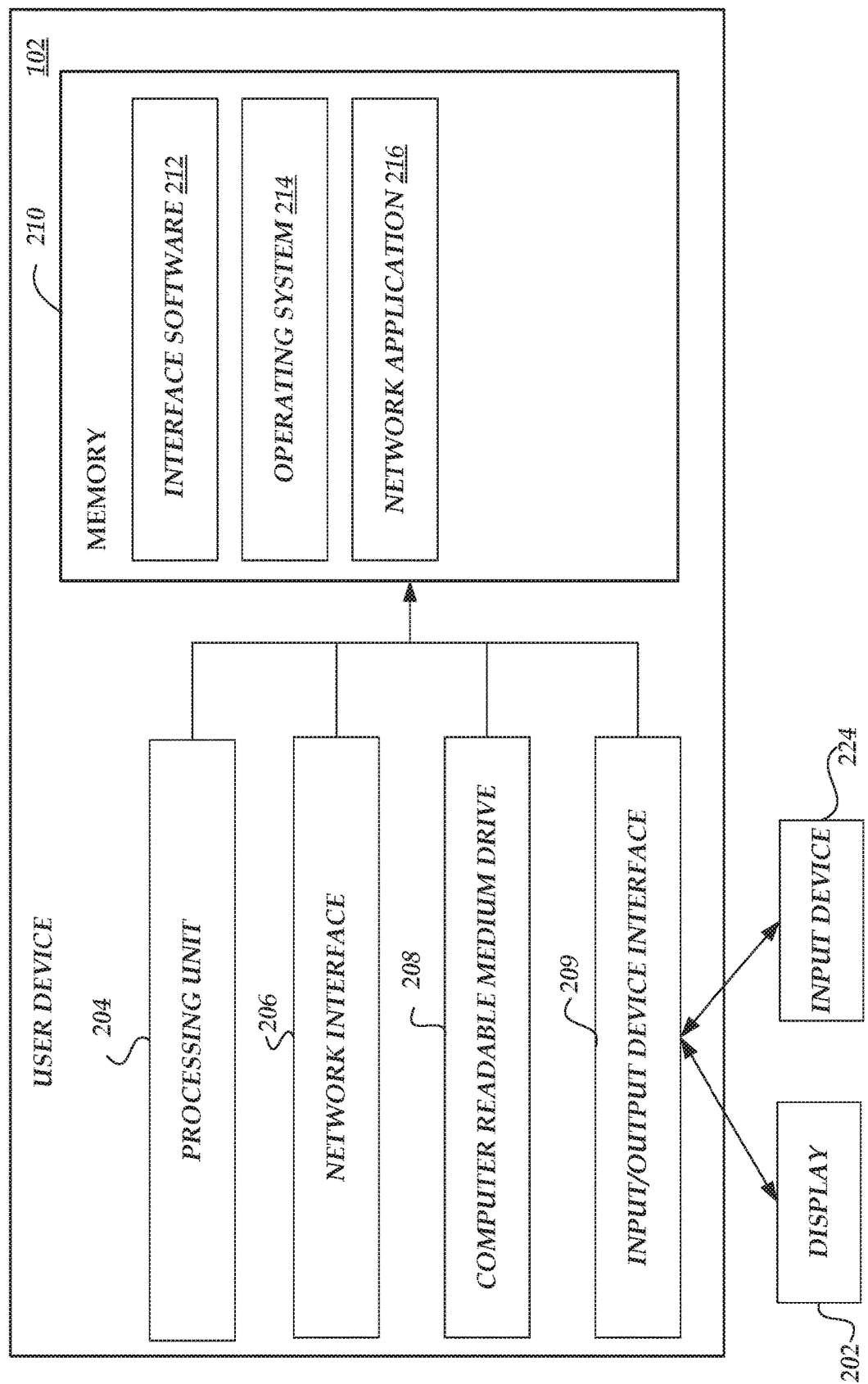
FIG. 2 is a block diagram of illustrative components of a user computing device configured to interface with customer applications in accordance with an illustrative embodiment.

FIG. 2 depicts an embodiment of an architecture of an illustrative user device 102 that interacts with customer applications 124 in accordance with the present disclosure. The general architecture of the user device 102 depicted in FIG. 2 includes an arrangement of computer hardware and software components that may be used to implement aspects of the present disclosure. As illustrated, the user device 102 includes a processing unit 204, a network interface 206, a computer readable medium drive 208, an input/output device interface 209, an optional display 202, and an input device 224, all of which may communicate with one another by way of a communication bus.

The network interface 206 may provide connectivity to one or more networks or computing systems, such as the network 150 of FIG. 1 and the web services system 120. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user device 102 may include more or fewer components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user device 102. The memory 210 may further include computer program instructions and other information for implementing aspects of the present disclosure. For example, in one embodiment, the memory 210 includes interface software 212 and a network application 216, such as browser application, for interacting with the customer applications 124 of the web services system 120.

Figure 3A:
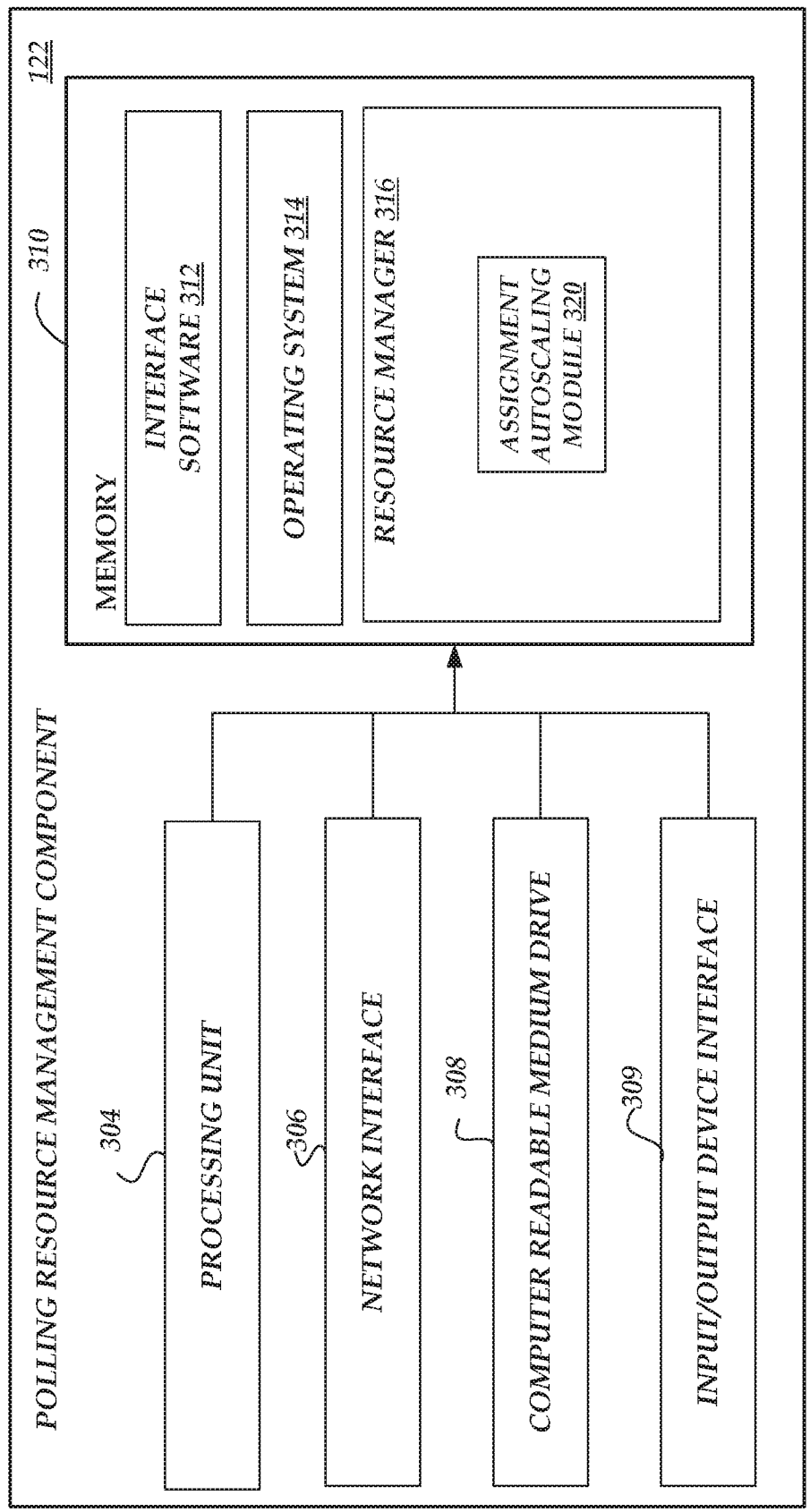
FIG. 3A is a block diagram of illustrative components of a polling resource management component configured to manage polling resources for customer message queues in accordance with an illustrative embodiment.

FIG. 3A depicts one embodiment of an illustrative server for managing polling resources as described herein. The general architecture of the polling resource management component 122 depicted in FIG. 3A includes an arrangement of computer hardware and software components that may be used to implement aspects of the present disclosure. As illustrated, the polling resource management component 122 includes a processing unit 304, a network interface 306, a computer readable medium drive 308, and an input/output device interface 309, all of which may communicate with one another by way of a communication bus. The components of polling resource management component 122 may be physical hardware components or implemented in a virtualized environment.

The network interface 306 may provide connectivity to one or more networks or computing systems, such as the network 150 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the polling resource management component 122 may include more or fewer components than those shown in FIG. 3A.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the polling resource management component 122. The memory 310 may further include computer program instructions and other information for implementing aspects of the present disclosure. For example, in one embodiment, the memory 310 includes interface software 312 for receiving and processing requests interaction with the customer applications 124 from user devices 102. Additionally, the memory 310 includes a polling resource management component 316 for managing polling resources. The polling resource management component 316 can further include modules that implement the functionalities of the polling resource management component 122 of FIG. 1.

As will be described in detail below, the polling resource management component 316 may include a polling assignment autoscaling module 320 comprising instructions for adjusting a quantity of polling assignments associated with or allocated to a customer message queue 128.

Figure 3B:
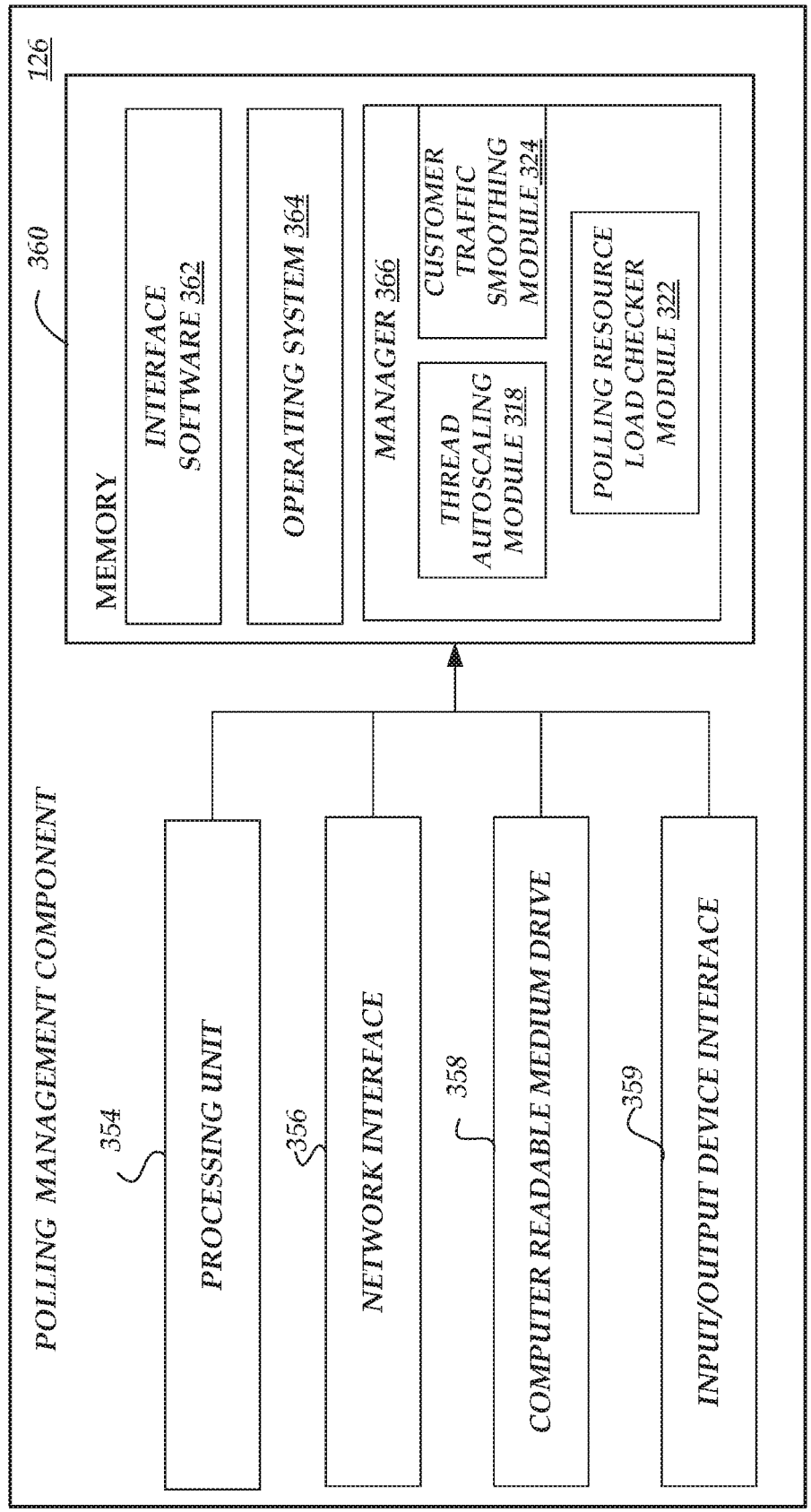
FIG. 3B is a block diagram of illustrative components of a polling management component configured to manage polling resources for customer message queues in accordance with an illustrative embodiment.

FIG. 3B depicts one embodiment of an illustrative server for managing polling resources as described herein. The general architecture of the polling management component 126 depicted in FIG. 3B includes an arrangement of computer hardware and software components that may be used to implement aspects of the present disclosure. As illustrated, the polling management component 126 includes a processing unit 354, a network interface 356, a computer readable medium drive 358, and an input/output device interface 359, all of which may communicate with one another by way of a communication bus. The components of polling resource management component 126 may be physical hardware components or implemented in a virtualized environment.

The network interface 356 may provide connectivity to one or more networks or computing systems, such as the network 150 of FIG. 1. The processing unit 354 may thus receive information and instructions from other computing systems or services via a network. The processing unit 354 may also communicate to and from memory 360 and further provide output information for an optional display via the input/output device interface 359. In some embodiments, the polling management component 126 may include more or fewer components than those shown in FIG. 3B.

The memory 360 may include computer program instructions that the processing unit 354 executes in order to implement one or more embodiments. The memory 360 generally includes RAM, ROM, or other persistent or non-transitory memory. The memory 360 may store an operating system 364 that provides computer program instructions for use by the processing unit 354 in the general administration and operation of the polling resource management component 126. The memory 360 may further include computer program instructions and other information for implementing aspects of the present disclosure. For example, in one embodiment, the memory 360 includes interface software 362 for receiving and processing requests interaction with the customer applications 124 from user devices 102. Additionally, the memory 360 includes a polling management component 366 for managing polling resources. The polling management component 366 can further include modules that implement the functionalities of the polling resource management component 126 of FIG. 1.

As will be described in detail below, the polling management component 366 may include a polling thread autoscaling module 318 comprising instructions for adjusting a quantity of polling threads associated with or allocated to a polling assignment, a polling resource load checker module 322 comprising instructions for unallocating polling resources, and a customer traffic smoothing module 324 comprising instructions for adjusting a quantity of invoke threads or workers associated with or allocated to a polling assignment.

Figure 4:
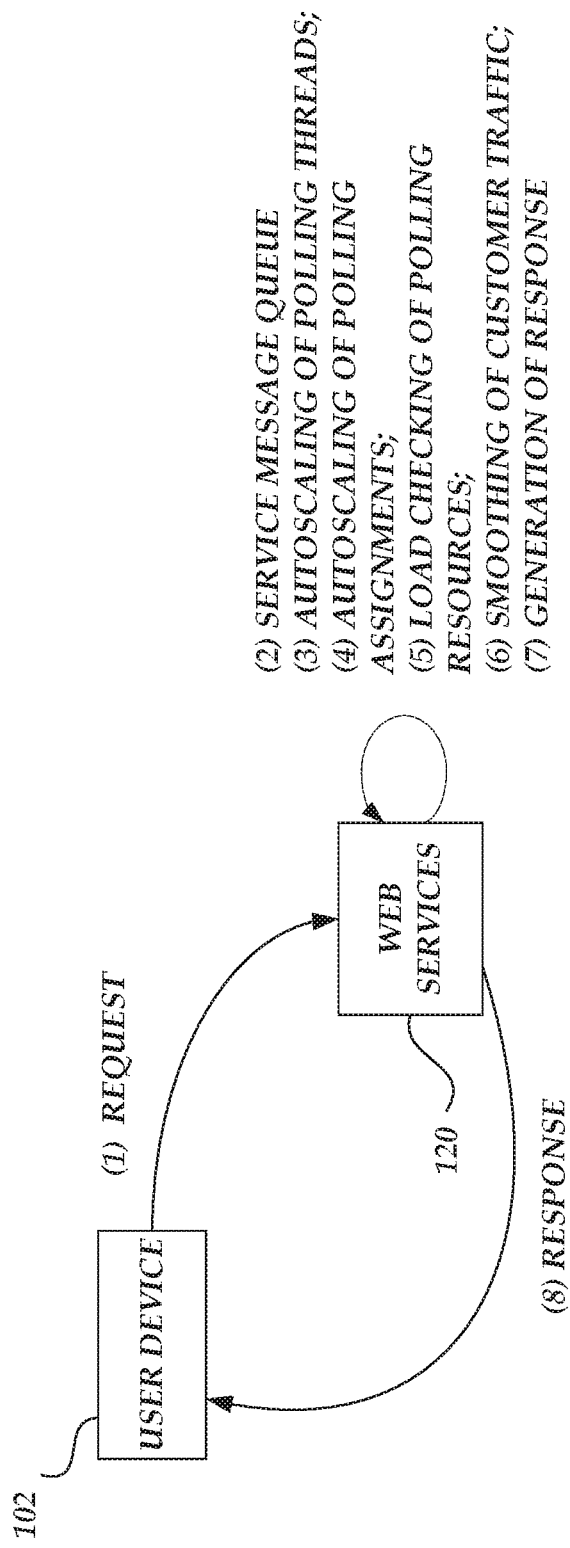
FIG. 4 is a block diagram of the operating environment of FIG. 1 illustrating the interaction relating to the web services system for managing customer message queues.

With reference to FIG. 4, an illustrative interaction for managing polling resources provided by the web services system 120 of FIG. 1 will be described. At (1), a user device 102 transmits a request for an interaction with a customer application 124, which can generate a message. The customer application 124 calls a send-message API, which stores the message in the customer message queue 128 At (2), the polling management component 126 services the customer message queues 128 using the polling resources, such as the polling assignments, the polling threads, and the invoke threads. For example, the polling assignment polls the message queue 128 looking for messages. The polling management component 126 calls a receive-message API to retrieve the message from the message queue 128. The polling thread receives the message from the message queue 128 and when the message is non-zero or associated with a function, the invoke thread invokes the associated function. The polling management component 126 services the top message in the message queue 128 and removes the message from the message queue 128. The remaining messages in the message queue 128 move up.

In conjunction with the polling management component 126, the polling resource management component 122 increases, decreases, or reallocates the polling resources. At (3), the polling management component 126 can autoscale, such as by increasing, decreasing, or determining no change to the quantity or number of polling threads associated with the polling assignment. For example, the polling management component 126 can determine a success rate of the polling threads associated with a polling assignment by determining how many queries occurred and how many non-zero messages were returned by the polling threads during a time interval. The success rate can be determined as a percentage of the number of returned non-zero message to the number of queries. The success rate can be an indication of the message traffic. The polling management component 126 can increase, decrease, or determine no change to the number of polling threads based on the success rate. For example, the polling management component 126 increases the number of polling threads based on a comparison of the success rate with an upper boundary or upper threshold of the success rate. When the success rate is equal to or greater than the upper boundary, the polling management component 126 increases the number of polling threads until a maximum number of polling threads is reached. The polling management component 126 decreases the number of polling threads based on a comparison of the success rate with a lower boundary or lower threshold of the success rate. When the success rate is equal to or less than the lower boundary, the polling management component 126 decreases the number of polling threads until a minimum number of polling threads is reached. When the success rate is between the upper and lower boundaries, the polling management component 126 does not change the number of polling threads.

At (4), the polling resource management component 122 can autoscale, such as by increasing, decreasing, or determining no change to the quantity or number of polling assignments associated with a customer message queue 128. For example, the polling resource management component 122 can determine the utilization of the polling assignments by determining the number of polling assignments that have reached a maximum number of associated polling threads. The assignment utilization can be an indication of message traffic. The polling resource management component 122 can increase, decrease, or determine no change to the number of polling assignments based on the assignment utilization. For example, the polling resource management component 122 increases the number of polling assignments based on a comparison of the utilization of the polling assignments with an upper boundary or upper threshold of the utilization. When the utilization is equal to or greater than the upper boundary, the polling resource management component 122 increases the number of polling assignments until a maximum number of polling assignments is reached. The polling resource management component 122 decreases the number of polling assignments based on a comparison of the utilization with a lower boundary or lower threshold of the utilization. When the utilization is equal to or less than the lower boundary, the polling resource management component 122 decreases the number of polling assignments until a minimum number of polling threads is reached. When the utilization is between the upper and lower boundaries, the polling resource management component 122 does not change the number of polling assignments.

At (5), the polling management component 126 can unallocate assignments from over-serviced message queues to make polling functions available to under-serviced message queues based on message traffic. For example, the polling management component 126 can determine the number of non-zero messages returned for each polling assignment for a time period. If any of the polling assignments have low message traffic based on the number of returned messages, the polling management component 126 can determine the least active polling assignment based on the number of returned messages and unallocate the polling assignment from the customer message queue 128. If none of the polling assignments have low message traffic based on the number of returned messages, the polling management component 126 can determine the queue depth or the number of messages waiting to be serviced in the customer message queue 128 and unallocate the least active polling assignment based on the queue depth. The unallocated polling assignments can be reallocated to other message queues with greater message traffic.

At (6), the polling management component 126 can smooth customer traffic to the message queues 128 by determining the invocation rate of the invoke threads and adjusting the quantity or number of invoke threads concurrently available to invoke functions. For example, the polling management component 126 can determine the invocation rate by determining the percentage of invoke threads in use during a period of time to the number of invoke threads available. Based on the invocation rate, the polling management component 126 can increase, decrease, or determine no change to the number of invoke threads concurrently available to the polling assignment. The invocation rate can be an indication of message traffic. In an aspect, the invocation rate can be an indication of burst message traffic. Adjusting the number of invoke threads concurrently available can smooth customer message traffic for short bursts. Smoothing the customer traffic reallocates the invoke threads to be used for message queues experiencing bursts of message traffic. This can reduce latency experienced by the user when invoke threads are statically allocated.

In an aspect, any one or any combination of the steps at (3), (4), (5), and (6) can be implemented to manage the polling resources. Any one or any combination of the steps at (3), (4), (5), and (6) can be implemented by any one of or both of the polling management component 126 and the polling management component 122.

At (7), the customer application 124 generates the response to the user request, and at (8), the web services system 120 transmits the response via the network 150 to the requesting user device 102. The response is generated when the message the placed in the message queue 128 in response to the request at (1) reached the top of the message queue 128.

Figure 5:
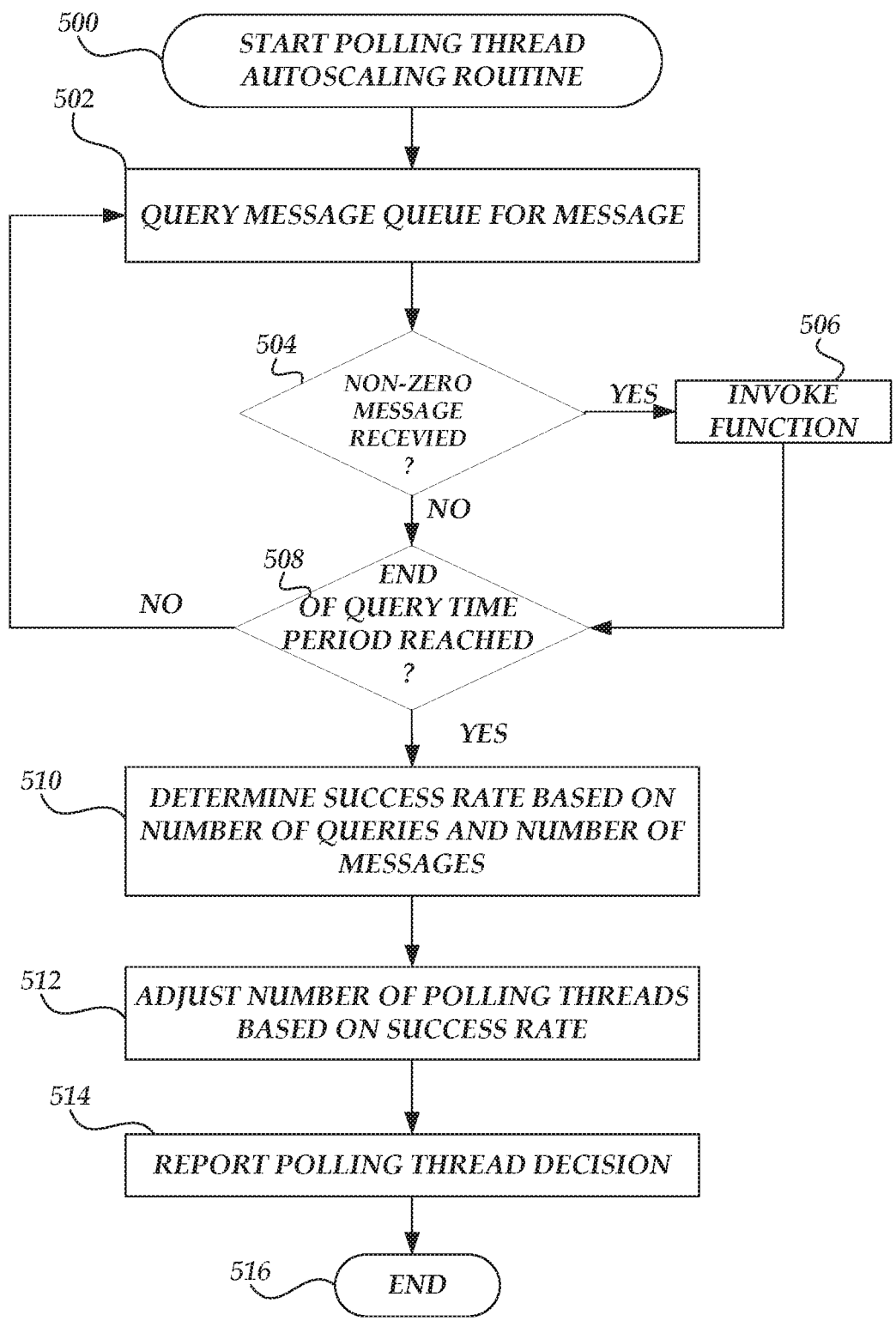
FIG. 5 is a flow diagram illustrative of a polling thread autoscaling routine implemented by a polling manager of a web services system.

Turning now to FIG. 5, a routine 500 utilized by the web services system 120 to autoscale polling threads associated with a polling assignment in response to customer message traffic will be described. Routine 500 can be deployed on the host that is running the customer application 124 and can make local decisions based on message traffic to increase or decrease the local resources. The local resources can be the polling threads for the customer's message queue 128. Routine 500 can be characterized as performing local autoscaling. In an embodiment, the number of polling threads associated with a polling assignment can have a maximum and a minimum. In other words, the number of polling threads associated with a polling assignment, in an embodiment, cannot increase above a maximum number of polling threads and cannot decrease below a minimum number of polling threads. Routine 500 may be invoked after the polling management component 126 receives a threshold number of messages, on a periodic basis to adjust the number of polling threads, anytime the polling management component 126 manages the polling of the message queues, or in any combination of the above.

Routine 500 may be illustratively implemented by the polling management component 126, the polling resource management component 122, or a combination of the polling management component 126 and the polling resource management component 122.

At block 502, the polling management component 126 queries the message queue 128 for messages. Routine 500 may be implemented as a loop that returns to block 502 once end block 516 is reached. At decision block 504, a determination is made as to whether a non-zero message is received from the message queue 128. Messages can be characterized as empty messages and non-zero messages. Illustratively, an empty message can be a message with no message or function to process and a non-zero message can be a message that is associated with a function. A query that does not return a message can be an unsuccessful query. Successful receive-message calls occur when polling the message queue retrieves a non-zero message associated with a function to invoke. If a non-zero message is not returned, the routine 500 moves to decision block 508.

If a non-zero message is received, the routine 500 moves to block 506, where an invoke thread invokes the function.

In an embodiment, the routine 500 queries the message queues 128 for a query time period. The query time period can be a time period in which the number of queries and the number of non-zero message returns are counted. At decision block 508, a determination is made as to whether the query time period has ended. If the query time period has not expired, the routine 500 returns to block 502 to query for additional messages. For example, the polling management component 126 may count the number of queries and count the number of non-zero message returns for a period of time.

For example, the count of the number of queries is set to zero at the beginning of the period of time and incremented for each query during the period of time. The count of the number of non-zero message returns queries is set to zero at the beginning of the period of time and incremented for each non-zero message returned from the query during the period of time. In an embodiment, the period of time is preset. In another embodiment, the period of time is dynamically adjustable based on message traffic. In an embodiment, the period of time is approximately 10 seconds. In other embodiments, the period of time may be greater than or less than 10 seconds. For example, the period of time can be approximately 5 seconds, 15 seconds, 20 seconds, 25 seconds, 30 seconds, 45 seconds, or 1 minute. If the query time period has expired, the routine 500 moves to block 510.

At block 510, the polling management component 126 determines the success rate based at least in part on the number of queries and the number of successful or non-zero message returns. In an aspect, the success rate can be a ratio of the number of successful non-zero message returns to the number of queries for the query time period. In an embodiment, the success rate can be expressed as a percentage. The success rate can have an upper boundary and a lower boundary. The upper boundary can define a success rate that indicates high message traffic and the lower boundary can define a success rate that indicates low message traffic.

At block 512, the polling management component 126 adjusts the quantity or number of polling threads based at least in part on the success rate. For example, the success rate above a first success threshold can be utilized to characterize message traffic as high message traffic. When the success rate indicates high message traffic, the polling management component 126 can increase the number of polling threads associated with the polling assignment. The success rate below a second success threshold can be utilized to characterize message traffic as low message traffic. When the success rate indicates low message traffic, the polling management component 126 can decrease the number of polling threads associated with the polling assignment. In an embodiment, the adjusted number of polling threads associated with the polling assignment cannot increase above the maximum number of polling threads and cannot decrease below the minimum number of polling threads. When the success rate does not indicates high message traffic and does not indicate low message traffic, no action is taken.

For example, let 50% be the upper boundary of the success rate, 20% be the lower boundary of the success rate, the maximum number of polling threads for an assignment be 20, and the minimum number of polling threads for an assignment be 1. When the success rate is greater than 50%, 2 polling threads are added to the polling assignment and when the success rate is less than 20%, 1 polling thread is removed from the polling assignment. Assume that the illustrative polling assignment has 10 polling threads. If in a 10 second query time period, 5 or more of the polling threads receive non-zero messages, then 2 polling threads are added to the polling assignment, not going above 20. If only 1 or 2 polling threads receive non-zero messages, and the other 8 polling threads do not receive any messages, then 1 polling thread is released from the polling assignment, not going below 1. For success rates between 20% and 50%, no action is taken.

At block 514, the polling management component 126 optionally reports the results of the autoscaling as the polling thread decision. For example, the polling management component 126 can push the results of the local decision to a global autoscaling routine, such as routine 600, described herein.

Routine 500 terminates at block 516 or starts a new iteration of routine 500. In an embodiment, the routine 500 waits for a period of time before starting a new iteration. In an embodiment, the polling management component 126 waits approximately 30 seconds before taking another scaling action. In other embodiments, the polling management component 126 waits more or less than 30 seconds before taking another scaling action.

Figure 6:
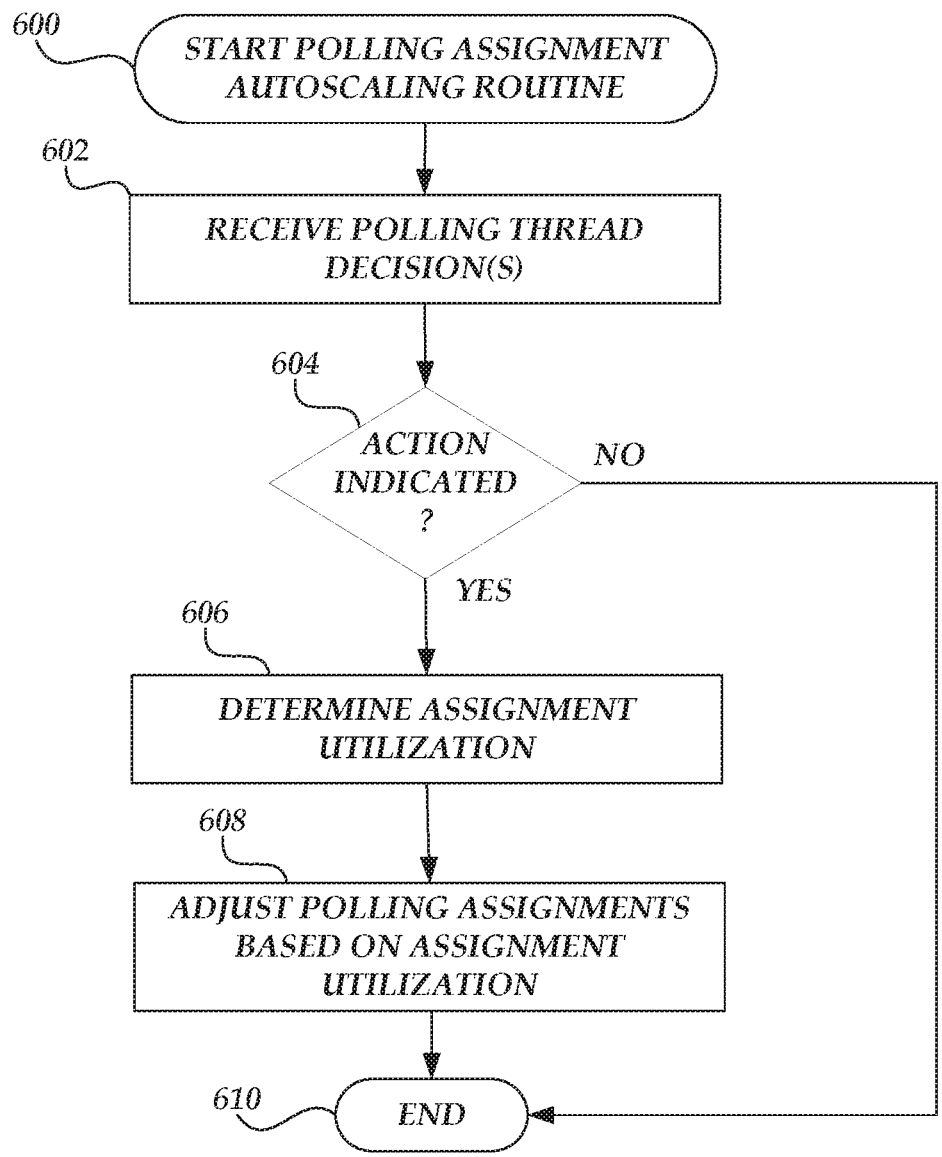
FIG. 6 is a flow diagram illustrative of a polling assignment autoscaling routine implemented by a polling resource manager of a web services system.

Turning now to FIG. 6, a routine 600 utilized by the web services system 120 to autoscale polling assignments in response to customer message traffic will be described. Routine 600 can be deployed on the control plane and can make global decisions based on message traffic to add or remove local polling resources, such as the polling assignments associated with the customer's message queue 128. Routine 600 can be characterized as performing global autoscaling.

Routine 600 may be illustratively implemented by the polling resource management component 122, the polling management component 126, or a combination of the polling management component 126 and the polling resource management component 122.

At block 602, the polling resource management component 122 receives/reviews the polling thread decisions. Routine 600 may be implemented as a loop that returns to block 602 once end block 610 is reached. In an embodiment, the polling thread decisions are the results of block 512 and are reported in block 154 in FIG. 5. The polling thread decisions can indicate that the polling threads for the polling assignment were increased, decreased, or not changed. Routine 600 may be invoked after the polling resource management component 122 receives a threshold number of polling thread decisions, on a periodic basis to adjust the number of polling assignments, anytime the polling resource management component 122 manages the polling assignments, or in any combination of the above.

At decision block 604, the polling resource management component 122 determines whether the polling thread decision indicates an action. If so, the routine 600 moves to block 606. If not, the routine 600 ends at block 610.

At block 606, the polling resource management component 122 determines the polling assignment utilization based at least in part on the quantity or number of polling assignments that are associated with a maximum number or an upper limit of associated polling threads to the total number of polling assignments. The upper limit can be the maximum number of polling threads that are permitted to associate with a polling assignment or the upper limit may be a quantity of polling threads less than the maximum number. In an aspect, the assignment utilization can be a ratio of the quantity or number of polling assignments that are associated with the maximum number or upper limit of polling threads to the total number of polling assignments. In an embodiment, the polling assignments can be associated with a specific customer application 124 and a dedicated message queue 128. In another embodiment, polling assignments can be associated with a shared message queue 128 that is shared among multiple customer applications 124, where the polling assignments are also shared among the multiple customer applications 124. The assignment utilization can be an indication of message traffic. In an embodiment, the assignment utilization can be expressed as a percentage.

The assignment utilization can have an upper boundary and a lower boundary. The upper boundary can define an assignment utilization that indicates high message traffic and the lower boundary can define an assignment utilization that indicates low message traffic.

At block 608, the polling resource management component 122 adjusts the quantity or number of polling assignments based at least in part on the assignment utilization. For example, the utilization above a first utilization threshold can be utilized to characterize message traffic as high message traffic. When the assignment utilization indicates high message traffic, the polling resource management component 122 can increase the number polling assignments associated with the customer application 124 or message queue 128. The utilization below a second utilization threshold can be utilized to characterize message traffic as low message traffic. When the assignment utilization indicates low message traffic, the polling resource management component 122 can decrease the number of polling assignments associated with the customer application 124 or message queue 128. In an embodiment, the adjusted number of polling assignments cannot increase above the maximum number of polling assignments and cannot decrease below the minimum number of polling assignments. When the assignment utilization does not indicates high message traffic and does not indicate low message traffic, no action is taken.

For example, when the polling resource management component 122 determines that 60% of the polling assignments are incurring high message traffic, the polling resource management component 122 can increase the number of assignments by 2, as long as the maximum number of assignments is not exceeded. In the illustrative example, when 30% of the polling assignments are incurring low message traffic, the polling resource management component 122 can decrease the number of assignments by 1, as long as the number of polling assignments is not reduced below the minimum number of assignments.

Routine 600 terminates at block 610 or starts a new iteration of routine 600. In an embodiment, the routine 600 waits for a period of time before starting a new iteration. In an embodiment, the polling resource management component 122 waits approximately 30 seconds before taking another scaling action for the polling assignments. In other embodiments, the polling resource management component 122 waits more or less than 30 seconds before taking another scaling action for the polling assignments.

Figure 7:
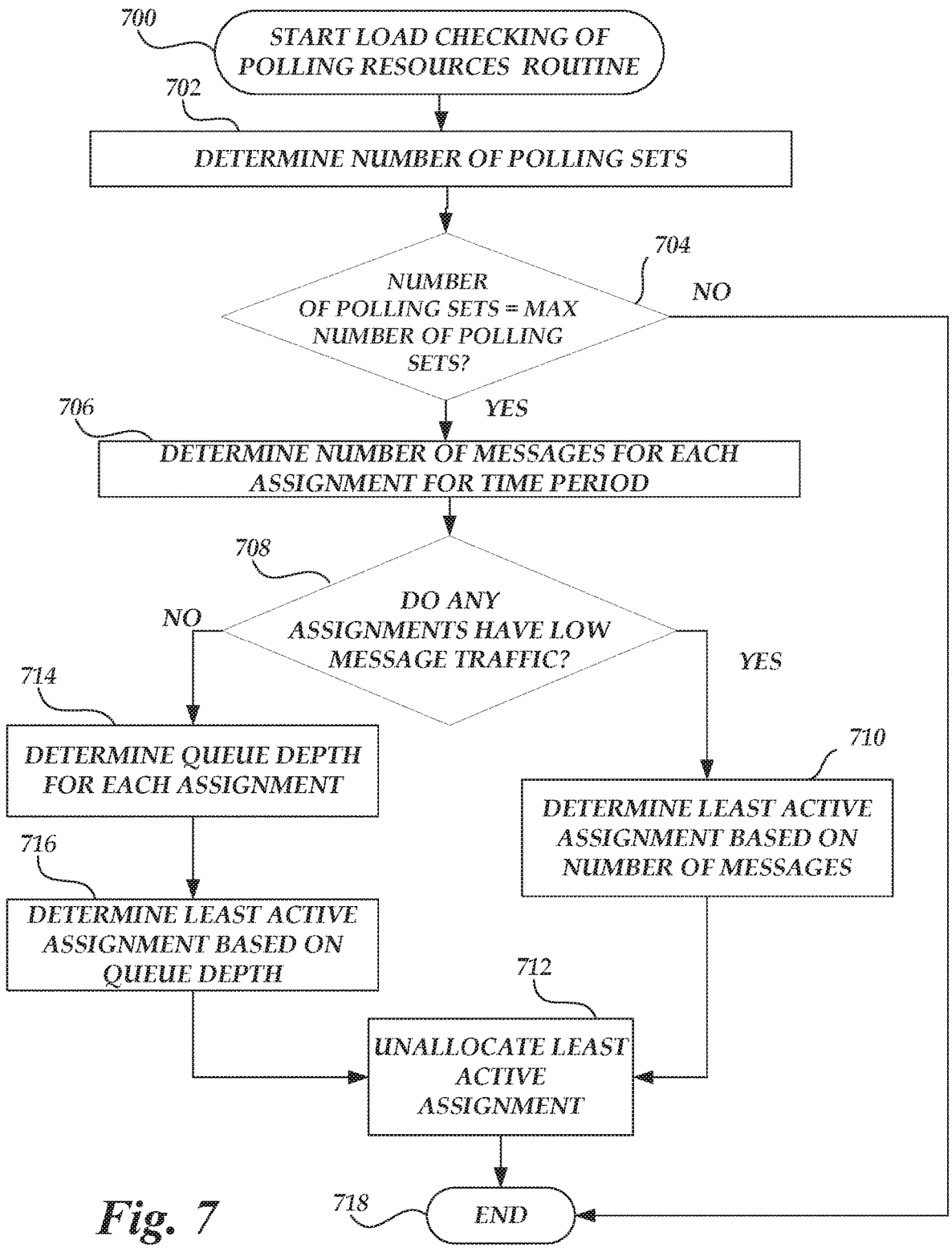
FIG. 7 is a flow diagram illustrative of a polling resource load checking routine implemented by a polling manager of a web services system.

Turning now to FIG. 7, a routine 700 utilized by the web services system 120 to unallocate polling assignments will be described. Routine 700 may be illustratively implemented by the polling resource management component 122, the polling management component 126, or a combination of the polling management component 126 and the polling resource management component 122. Routine 700 may be implemented in a loop that returns to block 702 once end block 718 is reached. Routine 700 may be invoked after the polling management component 126 receives a threshold number of messages, a threshold number of polling thread decisions, on a periodic basis to adjust the allocation of polling assignments, anytime the polling resource management component 122 or the polling management component 126 manages the polling assignments, or in any combination of the above.

In typical applications, the web services system 120 does not have unlimited polling assignments, polling threads, and invoke threads to service the message queues 128. When message traffic increases for a polling instance, such as for a polling message queue 128 associated with a specific customer application 124 or a polling message queue 128 that is shared among multiple customer applications 124, it is possible that the polling instance can become oversubscribed. The users requesting responses from oversubscribed instances may experience delays. Other polling instances may be under-subscribed, which results in an inefficient use of polling resources, such as polling sets that include polling assignment, associated polling threads, and concurrent invoke threads. In order to address this inefficiency, the polling resources management component 122 may initiate the polling resource allocation routine 700 to unallocate polling assignments for better polling resource utilization.

At block 702, the polling management component 126 determines the number of polling sets associated with a message queue 128. At decision block 704, the polling management component 126 makes a determination as to whether the determined number of polling sets is a maximum number of polling sets that can be allocated. For example, the polling management component 126 compares the determined number of polling sets associated with the message queue 128 with the maximum number of polling sets that can be allocated. In an embodiment, the maximum number of polling sets that can be allocated is preset. If the determined number of polling sets is not at the maximum number of polling sets that can be allocated, the routine 700 moves to end block 718.

When the number of polling sets reaches the maximum number, it can be an indication that the polling resources are being heavily utilized. For example, the polling management component 126 may include a load checker which can determine whether the web services system 120 is overloaded. The load checker can determine how many polling sets are being used and how many are available for use, and can estimate how many the web services system 120 can support based on message traffic patterns.

For example, the load checker can use assignment load checking to determine the number of active polling resources, such as assignments, and determine a buffer number of active polling resources. The buffer number can be a percentage of the number of active polling resources. In an embodiment, the buffer number can be approximately 10% of the number of active polling resources. In other embodiments, the buffer number can be more or less than 10%. The load checker adds the buffer number of polling resources to the total number of polling resources associated with the message queue 128 to provide an estimate of the number of polling resources that are needed. The total number of polling resources associated with the message queue 128 includes the number of active polling resources and the number of polling resources used for no traffic polling assignments. If the estimate of the polling resources is greater than the maximum number of allowed polling resources, the load checker determines that the web services system 120 is overloaded.

If the determined number of polling sets is at the maximum, then the routine 700 moves to block 706.

At block 706, the polling management component 126 determines the number of messages polled per polling assignment for a period of time. In an embodiment, the period of time is preset. At decision block 708, the polling management component 126 makes a determination as to whether any of the polling assignments have low message traffic based at least in part on the number of polled messages for each polling assignment. For example, a polling assignment associated with a number of messages polled above a first message number threshold can be characterized as having high message traffic and a polling assignment associated with a number of messages polled below a second message number threshold can be characterized as having low message traffic. The polling management component 126 can be configured to compare the number messages polled with the first and second message number thresholds to determine whether the polling assignment has low message traffic.

If any of the polling assignments have low message traffic, the routine 700 proceeds to block 710. If none of the polling assignments have low message traffic, the routine 700 proceeds to block 714.

At block 710, the polling management component 126 determines the least active polling assignment based at least in part on the number of polled messages. In an embodiment, the least active polling assignment is the polling assignment associated with the least number of polled messages.

At block 714, the polling management component 126 determines the queue depth for message queue 128 associated with each of the polling assignments. In an embodiment, the queue depth can be number of messages in the message queue 128 waiting to be polled. In an embodiment, the least active polling assignment can be the polling assignment associated with the smallest queue depth. At block 716, the polling management component 126 determines the least active polling assignment based at least in part on the queue depth.

At block 712, the polling management component 126 unallocates the least active polling assignment from the message queue 128. For example, the polling management component 126 unallocated by un-assigning the least active polling assignment from the message queue 128.

Routine 700 terminates at block 718 or starts a new iteration of routine 700.

In another embodiment, the load checker can use host metrics load checking at block 702 to determine whether the web services system 120 is overloaded. For host metrics load checking, the load checker determines the CPU or memory utilization for the host. When the CPU or memory utilization is greater than a maximum allowed utilization, such as 95 percent, for example, the polling management component 126 can unallocate assignments from the busiest or second most busy assignment.

In another embodiment, the load checker can use transaction processing system (TSP) load checking at block 712 to determine whether the web services system 120 is overloaded. For TSP load checking, the load checker determines the host TSP. When the host TSP reaches an upper percentage of the maximum number of TSP supported on the data plane instance, the polling management component 126 can unallocate assignments until a lower percentage of the maximum number of TSP supported on the data plane instance is reached. For example, when the host TSP reaches 98 percent of the maximum number of TSP supported on the data plane instance, the polling management component 126 can unallocate assignments until 95 percent of the maximum number of TSP supported on the data plane instance is reached.

Figure 8:
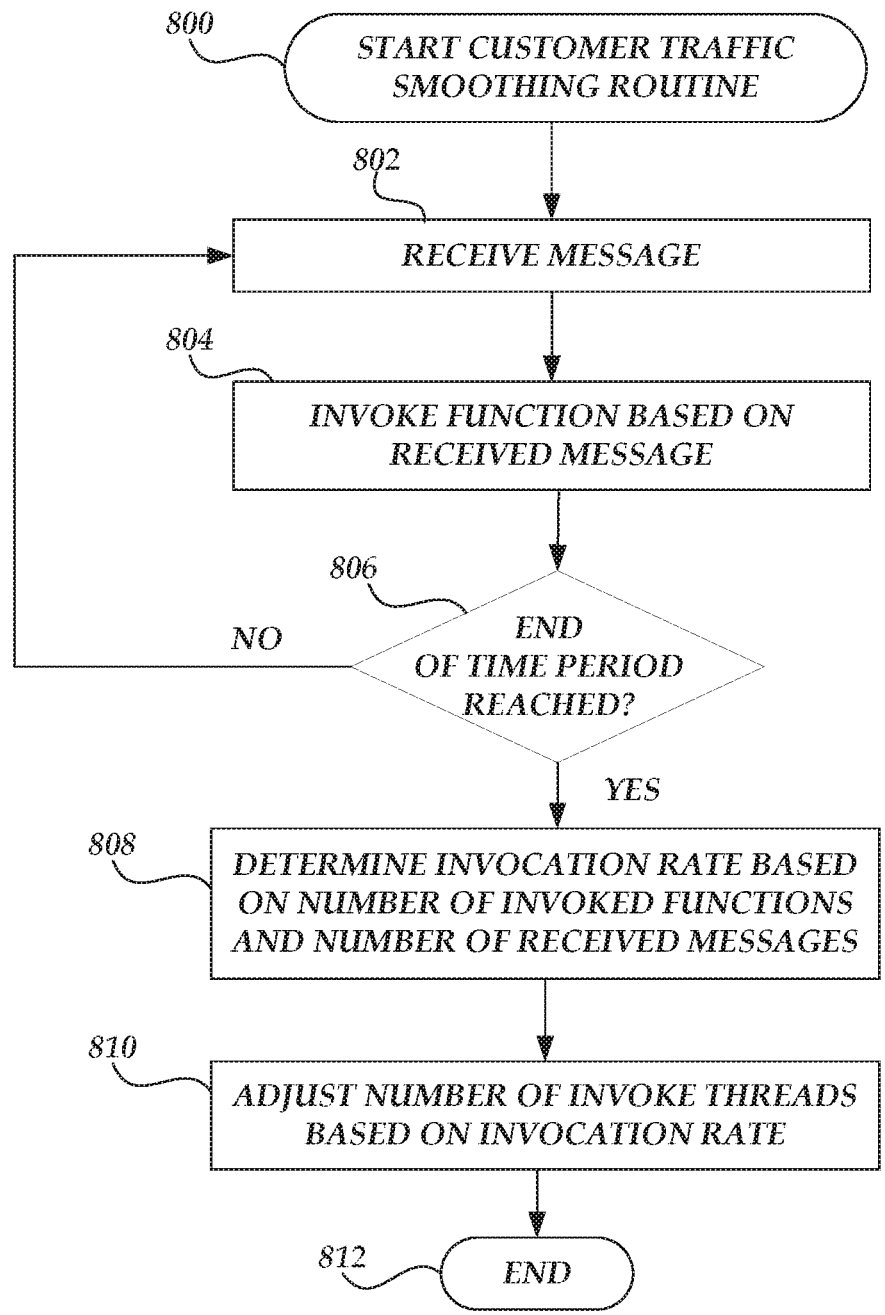
FIG. 8 is a flow diagram illustrative of a customer traffic smoothing routine implemented by a polling manager of a web services system.

Turning now to FIG. 8, a routine 800 utilized by the web services system 120 to autoscale invoke threads or workers to smooth bursts in customer message traffic will be described. Routine 800 may be illustratively implemented by the polling management component 126, the polling resource management component 122, or a combination of the polling management component 126 and the polling resource management component 122. Routine 800 may be invoked after the polling management component 126 receives a threshold number of messages, on a periodic basis to adjust the number of invoke threads, anytime the polling management component 126 or the polling resources management component 122 manages the polling of the message queues 128, or in any combination of the above.

Short bursts of message traffic being handled by a static number of invoke threads per polling assignment can lead to poor worker utilization. To address this inefficiency, the polling management resource component 122 can implement concurrency based throttling of the message queues 128 by autoscaling the quantity or number of invoke threads per assignment to smooth the message traffic. The autoscaling can be based on the number of invocations.

At block 802, the polling management component 126 receives a message after querying the message queue 128. Routine 800 may be implemented as a loop that returns to block 802 once end block 812 is reached.

As described above, messages may be characterized as empty messages and non-zero messages. Illustratively, an empty message can be a message with no message or function to process and a non-zero message can be a message that is associated with a function. For non-zero messages returned, at block 804, the invoke threads invoke the function associated with the message.

In an embodiment, the routine 800 counts messages for an invoke time period. The invoke time period can be a time period in which the number of messages received from the message queue 128 and the number of non-zero messages are counted. At decision block 806, a determination is made as to whether the invoke time period has ended. If the invoke time period has not expired, the routine 800 returns to block 802 to receive additional messages.

For example, the polling management component 126 may count the number of messages and the number of invoked functions for a period of time. For example, the count of the number of messages is set to zero at the beginning of the period of time and incremented for each message during the period of time. The count of the number of non-zero messages is set to zero at the beginning of the period of time and incremented for each non-zero message having a function that is invoked by the invoke threads. In an embodiment, the period of time is preset. In another embodiment, the period of time is dynamically determined based on message traffic. In an embodiment, the period of time is approximately 1 second. In other embodiments, the period of time may be greater than or less than 1 second. For example, the period of time can be approximately 0.5 seconds, 2 seconds, 10 seconds, or 30 seconds. If the invoke time period has expired, the routine 800 moves to block 808.

At block 808, the polling management component 126 determines an invocation rate based at least in part on the number of messages and the number of invoked functions. In an aspect, the invocation rate can be a ratio of the number of invocations to the number of messages for the invoke time period. The invocation rate can be expressed as a percentage. The invocation rate can have an upper boundary and a lower boundary. The upper boundary can define an invocation rate that indicates high message traffic and the lower boundary can define an invocation rate that indicates low message traffic.

At block 810, the polling management component 126 adjusts the quantity of invoke threads or workers based at least in part on the invocation rate. For example, the invocation rate above a first invocation threshold can be utilized to characterize message traffic as high message traffic. When the invocation rate indicates high message traffic, the polling management component 126 can increase the number of invoke threads associated with the polling assignment. The invocation rate below a second invocation threshold can be utilized to characterize message traffic as low message traffic. When the invocation rate indicates low message traffic, the polling management component 126 can decrease the number of invoke threads associated with the polling assignment. In an embodiment, the adjusted number of invoke threads associated with the polling assignment cannot increase beyond the maximum number of invoke threads and cannot decrease below the minimum number of invoke threads. When the invocation rate does not indicates high message traffic and does not indicate low message traffic, no action is taken.

For example, let 90% be the upper boundary of the invocation rate, 50% be the lower boundary of the invocation rate, the maximum number of concurrent invoke threads for a polling assignment be 250, and the minimum number of invoke threads for a polling assignment be 1. When the invocation rate is greater than 90%, 2 invoke threads are added to the assignment and when the invocation rate is less than 50%, 1 invoke thread is removed from the polling assignment. Assume that the illustrative polling assignment has 100 concurrent invoke threads. If in a 1 second invoke time period, 90 or more of the invoke threads are in use, then 2 invoke threads are added to the polling assignment, not going above 250. If only 30 of the invoke threads are in use, then 1 invoke thread is removed from the polling assignment, not going below 1. For an invocation rate between 50% and 90%, no action is taken.

In an aspect, the autoscaling of the invoke threads causes a fast ramp up for workloads where there is sufficient backlog of messages that the workers will be reused. Once ramped, up the ramp down rate can be slower than the ramp up rate in anticipation of more messages. Advantageously, this also can avoid the warm up time to ramp up and can increase the reuse of the workers.

Routine 800 terminates at block 812 or starts a new iteration of routine 800. In an embodiment, the routine 800 waits for a period of time before starting a new iteration. In an embodiment, the polling management component 126 waits approximately 10 seconds before taking another scaling action for the invoke threads. In other embodiments, the polling management component 126 waits more or less than 10 seconds before taking another scaling action.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other nontransitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to manage polling resources comprising:
   one or more computing devices associated with a polling manager of a web service, wherein the polling manager is configured to:
   query a message queue of a plurality of message queues for a first period of time for messages using polling assignments, wherein the message queue is associated with a customer application, wherein the messages are generated in response to a user interacting with the customer application, and wherein the customer application places the messages in the message queue;
   receive the messages from the message queue using polling threads;
   determine whether the received messages are associated with a function, wherein the customer application associates the message with the function, wherein the message associated with a function is characterized as a non-zero message;
   invoke the function using invoke threads for a determined non-zero message;
   determine a number of queries made to the message queue for the messages within the first time period;
   determine a number of non-zero messages returned from the queries within the first time period;
   determine a first utilization and a second utilization, wherein the first utilization is characterized as a ratio of a number of queries to a number of non-zero messages returned from the queries for the message queue, wherein the first utilization is associated with an upper boundary, wherein the second utilization is characterized by a ratio of a number of polling assignments associated with a maximum number of polling threads to a total number of the polling assignments for ones of the plurality of message queues, and wherein the second utilization is associated with an upper limit; and
   automatically perform, when the first utilization is greater than the upper boundary, locally increasing a quantity of the polling threads associated with the message queue, and when the second utilization is greater than the upper limit, globally increasing a quantity of polling assignments associated with the ones of the plurality of message queues.

2. The system of claim 1 wherein the polling manager is further configured to:
   wait a second time period before determining the number queries made to the message queue for the messages within a third time period;
   determine the number queries made to the message queue for the messages within the third time period;
   determine the number of non-zero messages returned from the queries within the third time period; and
   determine a third utilization responsive to the number of queries made to the message queue for the messages within the third time period and the number of non-zero messages returned from the queries within the third time period.

3. The system of claim 1 wherein the quantity of the one or more of the polling threads and the invoke threads is associated with a minimum quantity and a maximum quantity.

4. The system of claim 3 wherein automatically increasing the quantity of the one or more of the polling threads and the invoke threads when the first utilization is greater than the upper boundary includes not increasing the quantity of the one or more of the polling threads and the invoke threads beyond the maximum quantity.

5. The system of claim 3 wherein automatically decreasing the quantity of the one or more of the polling threads and the invoke threads when the second utilization is less than the lower boundary includes not decreasing the quantity of the one or more of the polling threads and the invoke threads below the minimum quantity.

6. A computer-implemented method to manage polling resources that service message queues, the computer-implemented method comprising:
- determining a number of queries made to a message queue for messages within a first time period, wherein one or more hosted applications place messages in the message queues, wherein at least a portion of the messages in the message queues are non-zero messages that are associated with a function, and wherein polling resources retrieve individual messages from the message queues and invoke functions associated with individual messages;
- determining a number of non-zero messages returned from the queries within the first time period;
- determining a first utilization of polling threads based on the number of queries and the number of non-zero messages returned from the queries;
- determining a second utilization of polling assignments based on a number of polling assignments associated with a maximum number of polling threads to a total number of the polling assignments for a plurality of message queues;
- autoscaling a quantity of polling threads associated with the message queue based on the first utilization; and
- autoscaling a quantity of polling assignments associated with the plurality of message queues based on the second utilization.

7. The computer-implemented method of claim 6 wherein the first utilization is characterized as a ratio of the number of non-zero messages to the number of queries.

8. The computer-implemented method of claim 6 wherein the first utilization is associated with an upper boundary and a lower boundary and the quantity of polling threads is associated with a maximum quantity and a minimum quantity.

9. The computer-implemented method of claim 8 wherein autoscaling the quantity of the polling threads based on the first utilization includes not changing the quantity of polling threads when the first utilization is between the upper and lower boundaries.

10. The computer-implemented method of claim 8 wherein autoscaling the quantity of the polling threads based on the first utilization includes increasing the quantity of polling threads when the first utilization is greater than the upper boundary and less than the maximum quantity.

11. The computer-implemented method of claim 8 wherein autoscaling the quantity of the polling threads based on the first utilization includes decreasing the quantity of polling threads when the first utilization is less than the lower boundary and greater than the minimum quantity.

12. The computer-implemented method of claim 8 further comprising unallocating a least active polling assignment associated with the message queue when the quantity of polling assignments is the maximum quantity.

13. The computer-implemented method of claim 12 further comprising determining the least active polling assignment responsive to at least one of the number of queries made to the message queue and queue depth associated with the message queue.

14. The computer-implemented method of claim 6 wherein the polling resources comprise one or more of one or more polling threads, one or more polling assignments, or one or more invoke threads.

15. The computer-implemented method of claim 14 wherein autoscaling the quantity of polling threads comprises local autoscaling.

16. The computer-implemented method of claim 14 wherein autoscaling the quantity of polling assignments comprises global autoscaling.

17. A computer-implemented method to automatically scale polling resources for processing messages generated by applications executed in a networked environment, the computer-implemented method comprising:
- determining a first utilization of polling threads based on recent message traffic associated with a message queue comprising a plurality of messages, wherein at least a portion of the plurality of messages in the message queue are associated with functions that are invoked when the messages are retrieved from the message queue and wherein one or more polling resources are configured to retrieve and invoke individual functions;
- determining a second utilization of polling assignments based on a number of polling assignments associated with a maximum number of polling threads to a total number of the polling assignments for a plurality of message queues;
- autoscaling up a quantity of polling threads in response to high message traffic characteristic for the message queue based, at least in part, by the first utilization;
- autoscaling down the quantity of polling threads in response to low message traffic characteristic for the message queue based, at least in part by the first utilization; and
- autoscaling a quantity of polling assignments associated with the plurality of message queues based on the second utilization.

18. The computer-implemented method of claim 17 wherein the first utilization is characterized as a ratio of a number of queries to the message queue to a number of non-zero messages returned from the queries and wherein the first utilization is associated with an upper boundary and a lower boundary.

19. The computer-implemented method of claim 18 wherein first utilization greater than the upper boundary is characterized as the high message traffic.

20. The computer-implemented method of claim 18 wherein first utilization less than the lower boundary is characterized as the low message traffic.

21. A system to manage polling resources comprising:
- one or more computing devices associated with a polling manager of a web service, the polling manager having data plane functionality, wherein the polling manager is configured to:
  - determine a number of queries made to each of a plurality of message queues for messages by respective polling assignments associated with each of the message queues within a first time period, wherein one or more hosted applications place messages in the message queues, wherein at least a portion of the messages in the message queues are non-zero messages that are associated with a function, and wherein polling threads retrieve individual messages from the message queues and invoke threads invoke functions associated with individual messages;

determine a number of non-zero messages returned from the queries within the first time period for each of the plurality of message queues;

determine a first utilization of polling resources based on the number of queries and the number of non-zero messages returned from the queries for each of the message queues; and autoscale a quantity of at least one of polling threads and invoke threads for each of the message queues based at least in part on the first utilization for each of the message queues; and one or more computing devices associated with a polling resource manager of the web service, the polling resource manager having control plane functionality, wherein the polling resource manager is configured to:

receive autoscale decisions for each of the message queues from the polling manager;

determine a second utilization of polling assignments based on a number of polling assignments associated with a maximum number of polling threads from the received autoscale decisions to a total number of the polling assignments for the plurality of message queues; and autoscale a quantity of polling assignments for each of the message queues of the plurality of message queues based at least in part on the second utilization.

22. The system of claim 21, wherein each polling assignment is associated with 1 to 35 polling threads.

23. The system of claim 21, wherein each message queue is associated with up to 10 polling assignments.

24. The system of claim 21, wherein the polling manager is further configured to poll the plurality of message queues.

25. The system of claim 21, wherein the polling manager is associated with the polling assignments that poll the message queues.

26. The system of claim 21, wherein autoscaling the quantity of at least one of the polling threads and the invoke threads comprises local autoscaling.

27. The system of claim 21, wherein autoscaling the quantity of polling assignments comprises global autoscaling.

* * * * *